(12) United States Patent
Nishimura et al.

(10) Patent No.: US 7,326,479 B2
(45) Date of Patent: Feb. 5, 2008

(54) PROTECTION CIRCUIT MODULE AND BATTERY PACK INCORPORATING THE SAME

(75) Inventors: Koshi Nishimura, Kyoto (JP); Mitsunori Nagashima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/360,971

(22) Filed: Feb. 23, 2006

(65) Prior Publication Data

US 2006/0147764 A1    Jul. 6, 2006

Related U.S. Application Data

(63) Continuation of application No. 10/328,732, filed on Dec. 23, 2002, now Pat. No. 7,037,608.

(30) Foreign Application Priority Data

Dec. 25, 2001  (JP) .............................. 2001-392798

(51) Int. Cl.
*H01M 2/02* (2006.01)
*H01M 2/18* (2006.01)
*H05K 7/02* (2006.01)

(52) U.S. Cl. ........................ 429/7; 429/61; 429/130; 361/809

(58) Field of Classification Search .................... 429/7, 429/61, 129, 130; 361/809
See application file for complete search history.

(56) References Cited

U.S. PATENT DOCUMENTS

| 5,898,575 | A | 4/1999 | Hawthorne et al. | ......... 361/809 |
|---|---|---|---|---|
| 6,248,470 | B1 | 6/2001 | Azema et al. | ................ 429/61 |
| 6,426,867 | B1 | 7/2002 | Zayatz | ...................... 429/7 X |
| 6,524,732 | B1 | 2/2003 | Iwaizono et al. | ............... 429/7 |
| 6,803,144 | B2 * | 10/2004 | Hovi et al. | ................. 429/7 X |
| 6,824,917 | B2 * | 11/2004 | Aaltonen et al. | ........... 429/7 X |
| 2003/0013010 | A1 | 1/2003 | Liu | ............................ 429/130 |

FOREIGN PATENT DOCUMENTS

JP          8-241700          9/1996

* cited by examiner

*Primary Examiner*—Stephen J. Kalafut
(74) *Attorney, Agent, or Firm*—Hamre, Schumann, Mueller & Larson, P.C.

(57) ABSTRACT

The protective circuit module includes a substrate, electronic components mounted on the substrate for constituting a protective circuit, a molding formed on the substrate to enclose the electronic components, and terminal plates connected to appropriate portions of the substrate for connecting the protective circuit to a rechargeable battery. The molding includes a cover surface oriented opposite to the substrate and projections integrally formed on the cover surface to project therefrom.

2 Claims, 7 Drawing Sheets

PROTECTION CIRCUIT MODULE AND BATTERY PACK INCORPORATING THE SAME

This application is a continuation of application Ser. No. 10/328,732, filed Dec. 23, 2002 now U.S. Pat. No. 7,037,608, entitled PROTECTION CIRCUIT MODULE AND BATTERY PACK INCORPORATING THE SAME, which application(s) are incorporation herein by reference.

BACKGROUND OF THE INVENTION

1. Field of the Invention

The present invention relates to a protection circuit module for a rechargeable battery and to a battery provided with such a protective circuit module.

2. Description of the Related Art

A battery pack for use as a rechargeable power source of portable terminal equipment such as a cellular phone is provided with a protective circuit for preventing a rechargeable battery from overcharging or over discharging. For convenience in assembling the battery pack, such a protective circuit is generally provided as a module.

FIG. 8 schematically illustrates an example of battery pack 30 comprising such a conventional protective circuit module 10 and a rechargeable battery 40 which are housed in a case 20.

The protective circuit module 10 basically comprises an insulating substrate 11 which is formed of e.g. glass-fiber-reinforced epoxy resin and has a surface on which electronic components for constituting a protective circuit are mounted and sealed by a molding 13, and conductor plates 14, 15 each having an end connected to the substrate 11 for connecting the protective circuit to the rechargeable battery 40. Each of the conductor plates 14 and 15 has another end connected to a positive electrode 41 or a negative electrode 42 provided on an outer shell of the rechargeable battery 40 by spot welding, for example. In the example shown in FIG. 8, a plurality of terminals 16 are formed on a surface of the substrate 11 opposite to the surface formed with the molding 13. With the protective circuit module 10 housed in the case 20, the terminals 16 are exposed to the outside through a window 21 formed in the case 20 for electrically connecting the battery pack 30 to the body of the portable terminal equipment. Through the terminals 16, charging current from a charger is supplied via the portable equipment body to the battery pack 30 and discharging current from the battery pack 30 is supplied to the portable equipment body.

The rechargeable battery 40 generally has a rectangular configuration having a predetermined thickness. Generally, the positive electrode 41 (or the negative electrode, which holds true hereinafter) is provided as a projection formed centrally on one of longitudinally opposite end surfaces of the battery, whereas the negative electrode 42 (or the positive electrode, which holds true hereinafter) comprises the entire conductor surface of the battery except the positive electrode. As shown in FIG. 8, to connect the conductor plate 14 to the positive electrode 41 in the form of a projection, the conductor plate need be bent at a right angle relative to the substrate 11 and again bent at a right angle to provide a portion 14b extending parallel to the end surface of the battery, and the portion 14b need be connected to the positive electrode 41 by spot welding.

As described above, since the entire outer shell of the rechargeable battery 40 except the positive electrode 41 constitutes the negative electrode, the horizontal portion 14B of the conductor plate 14 need be prevented from inadvertently coming into short-circuit contact with the outer shell of the battery. Generally, to cope with the need, a non-illustrated spacer is interposed between the protective circuit module 10 and the end surface 40a of the rechargeable battery 40.

However, such a coping method increases the number of parts of the battery pack 30 and deteriorates the efficiency in assembling the pack, which results in an increase in the manufacturing cost of the battery pack.

SUMMARY OF THE INVENTION

It is, therefore, an object of the present invention to provide a simple structure which can be provided without increasing the cost and which is capable of preventing a conductor plate of the module for connection to a battery from inadvertently coming into shorting contact with the opposite electrode of the battery surface in assembling the battery pack.

According to a first aspect of the present invention, there is provided a protective circuit module comprising a substrate, an electronic component mounted on the substrate for constituting a protective circuit, a molding formed on the substrate to enclose the electronic component, and terminal plates connected to appropriate portions of the substrate for connecting the protective circuit to a rechargeable battery. The molding includes a cover surface oriented opposite to the substrate and a projection integrally formed on the cover surface to project therefrom.

Preferably, the projection comprises a resin solidified in a resin injection port of a mold used for forming the molding.

Preferably, the cover surface is integrally formed with a plurality of projections.

Preferably, one of the terminal plates includes a through-hole for inserting the projection.

According to a second aspect of the present invention, there is provided a battery pack comprising a case, at least one rechargeable battery housed in the case, and a protective circuit module housed in the case. The protective circuit module comprises a substrate, an electronic component mounted on the substrate for constituting a protective circuit, a molding formed on the substrate to enclose the electronic component, and terminal plates connected to appropriate portions of the substrate for connecting the protective circuit to the rechargeable battery, and the molding includes a cover surface oriented opposite to the substrate and a projection integrally formed on the cover surface to project therefrom. The protective circuit module is arranged in the case with the projection pressed against the rechargeable battery so that the projection defines a distance between the rechargeable battery and the protective circuit module.

According to a third aspect of the present invention, there is provided a battery pack comprising a case, at least one rechargeable battery housed in the case, and a protective circuit module housed in the case. The protective circuit module comprises a substrate, an electronic component mounted on the substrate for constituting a protective circuit, a molding formed on the substrate to enclose the electronic component, and terminal plates connected to appropriate portions of the substrate for connecting the protective circuit to the rechargeable battery, and the molding includes a cover surface oriented opposite to the substrate and a projection integrally formed on the cover surface to project therefrom. The protective circuit module is positioned by bringing the projection of the molding into engagement with an engagement portion formed at an inner surface of the case.

According to the second and the third aspects of the present invention, the projection integrally formed on the molding functions as a spacer in the battery pack or functions as positioning means. With such a structure, it is possible to properly define the positional relationship between the rechargeable battery and the protective circuit module or the positional relationship between the protective circuit module and the case.

Other objects, features and advantages of the present invention will become clearer from the description of the preferred embodiment given below.

DETAILED DESCRIPTION OF THE PREFERRED EMBODIMENTS

Preferred embodiments of the present invention will be described below in detail with reference to FIGS. 1-7. In these figures, parts or portions which are identical or similar to those of the prior art structure shown in FIG. 8 are designated by the same reference signs.

Figure 1:
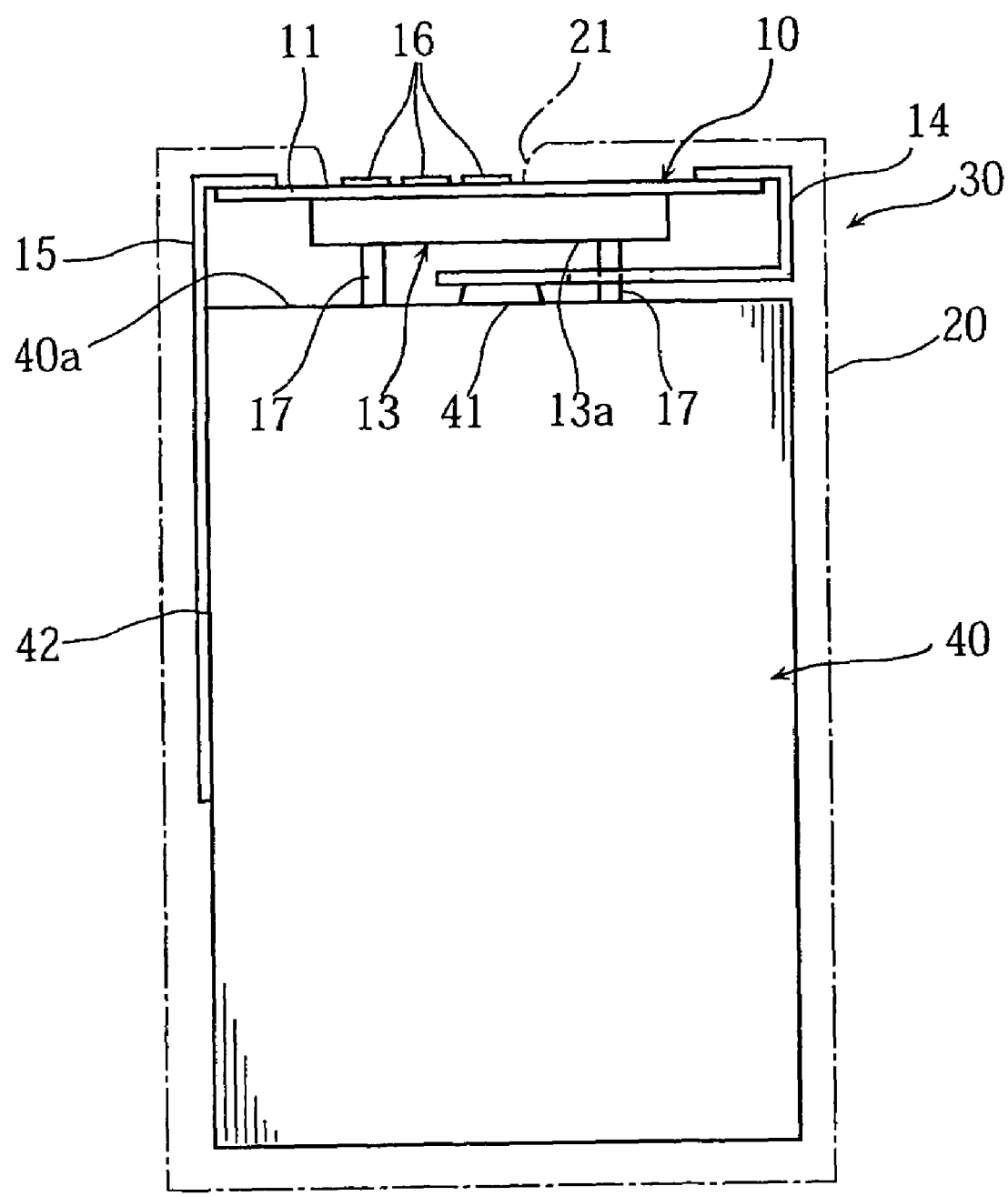
FIG. 1 is a schematic plan view illustrating a battery pack according to an embodiment of the present invention.

FIG. 1 schematically illustrates a battery pack 30 embodying the present invention, which comprises a casing 20 accommodating a protective circuit module 10 together with a rechargeable battery 40.

The protective circuit module 10 has a basic structure wherein electronic components 12 for constituting a protective circuit are mounted on one surface of an insulating substrate 11 formed of e.g. glass-fiber-reinforced epoxy resin as sealed in a molding 13, while conductor plates 14 and 15 each has an end connected to the substrate 11 for connecting the protective circuit to the rechargeable battery 40. Specifically, the substrate 11 comprises a short plate strip having a width corresponding to the thickness of the rechargeable battery 40 and having one surface provided with necessary electronic components 12 (See FIGS. 4A, 4B) as enclosed by the molding 13. The other surface of the substrate is formed with a plurality of terminals 16 and has opposite ends to which respective base ends of the conductor plates 14 and 15 are connected by soldering for example. Each of the conductor plates is a short strip extending longitudinally out from the substrate 11. The conductor plates 14 and 15 are formed of a nickel-based material in view of the suitability for soldering to the substrate 11 and for spot welding to the aluminum surface of the rechargeable battery 40.

The protective circuit module 10 having the above-described structure is built in the case 20 together with the rechargeable battery 40 as shown in FIG. 1, for example, thereby providing the battery pack 30. Specifically, the protective circuit module 10 is so arranged that one surface thereof, i.e. the surface provided with the molding 13 faces one end surface 40a of the rechargeable battery 40. The conductor plates 14 and 15 bent in a predetermined manner are respectively connected to a positive and a negative electrodes 41 and 42 provided at outer surfaces of the rechargeable battery 40 by spot welding. The terminals 16 provided on the other surface of the substrate 11 are exposed to the outside through a window 21 formed at an end surface of the case 20 for electric contact with the terminals of a portable equipment, thereby performing reception of a charging current via the main unit of the portable equipment and discharging to the main unit of the portable equipment.

In the present invention, the molding 13 of the protective circuit module 10 is integrally formed with projections 17. Specifically, the molding 13 has a thickness depending on the height of the electronic components 12 to be enclosed therein and has a substantially flat cover surface 13a on the side opposite to the substrate 11. Each of the projections 17 is integrally formed on the cover surface 13a to have a predetermined height. In the illustrated embodiment, two columnar projections 17 are provided as spaced longitudinally of the molding 13. However, the projection 17 may have any other shape such as a prism, a plate or an angled shape. The number and layout of the projections are not limitative.

Figure 2:
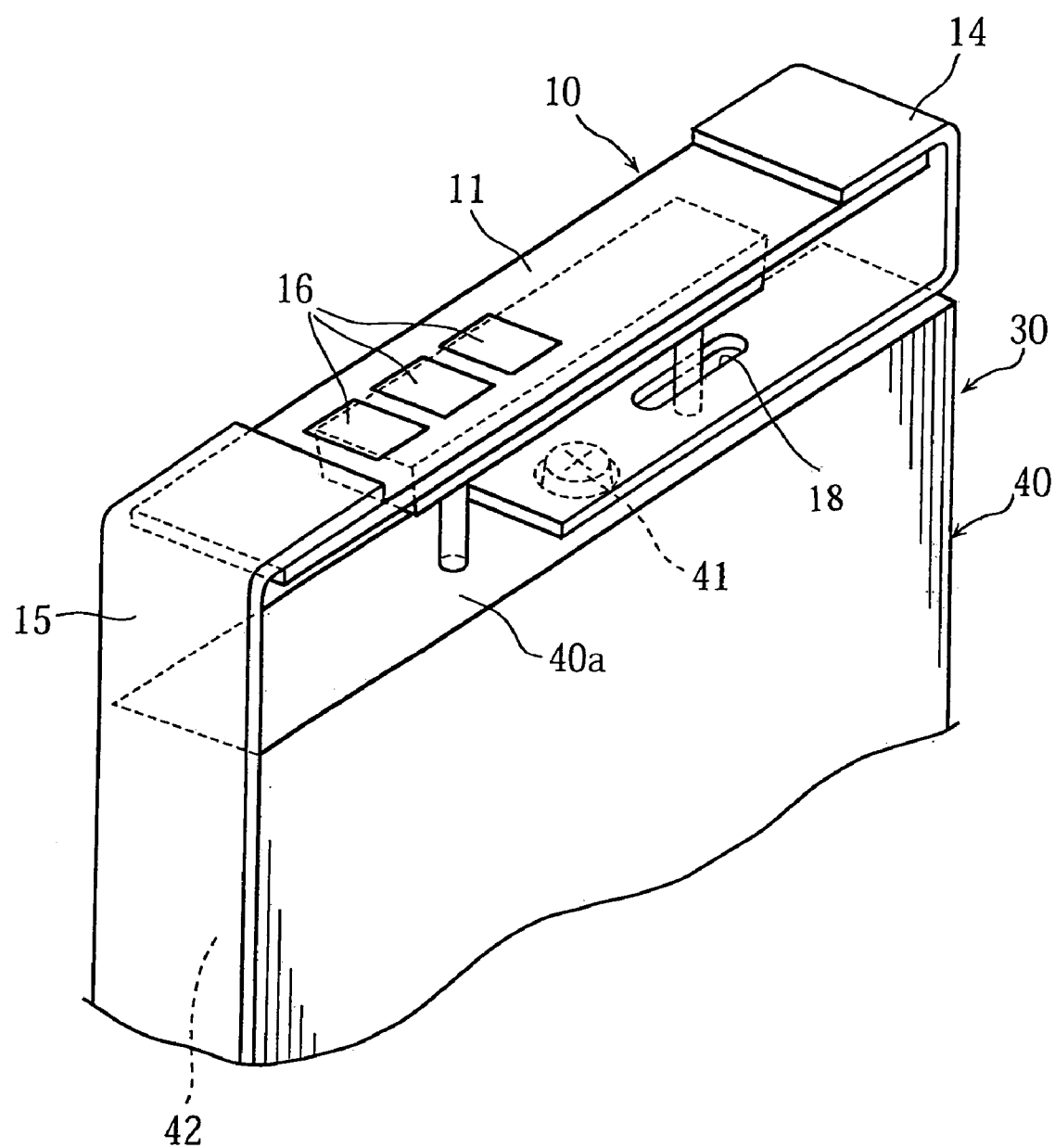
FIG. 2 is a perspective view illustrating the connection relationship between a protective circuit module and a rechargeable battery in the battery pack shown in FIG. 1.
Figure 3:
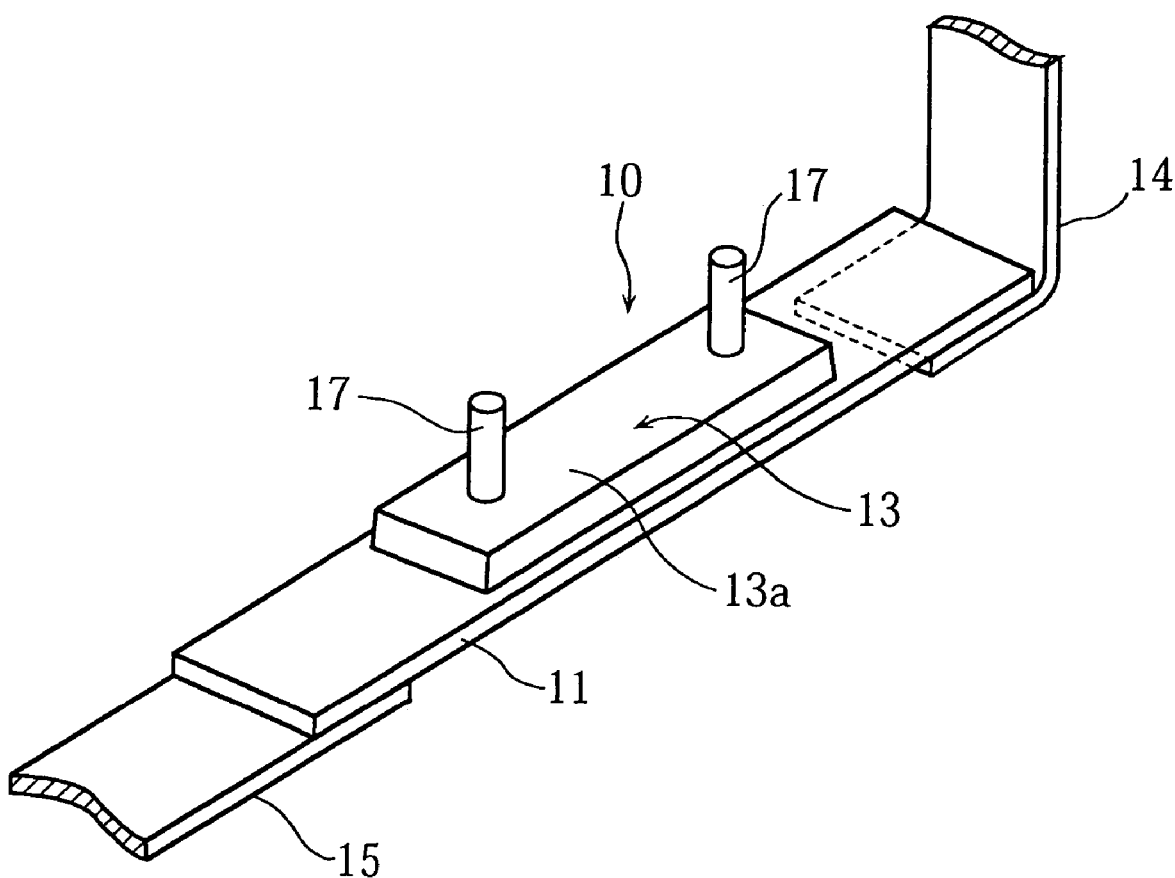
FIG. 3 is a partial perspective view illustrating a protective circuit module for use in the battery pack shown in FIG. 1.

The height of each projection 17 is so set that an end of the projection 17 abuts the end surface 40a of the rechargeable battery 40 for preventing the rechargeable battery 40 and the protective circuit module 10 from deviating in the case 20. In this way, the projection 17 serves as a spacer between the rechargeable battery 40 and the protective circuit module 10. As mentioned in the description of the related art, one of the positive and the negative electrodes 41 and 42 of the rechargeable battery 40 comprises a projection formed at a center portion of the end surface 40a of the rechargeable battery 40, whereas the other electrode is provided by the entire outer shell of the rechargeable battery 40. Therefore, in extending the conductor plate 14 to the positive electrode or negative electrode in the form of a projection, it is necessary to prevent the conductor plate 14 from inadvertently coming into contact with the outer shell of the rechargeable battery. However, in the illustrated embodiment, an additional spacer for such a purpose need not be provided. As shown in FIG. 2, depending on the position of the projection 17, a through-hole 14 for passing the projection 17 may be formed in the conductor plate 14, as required.

Figure 4A:
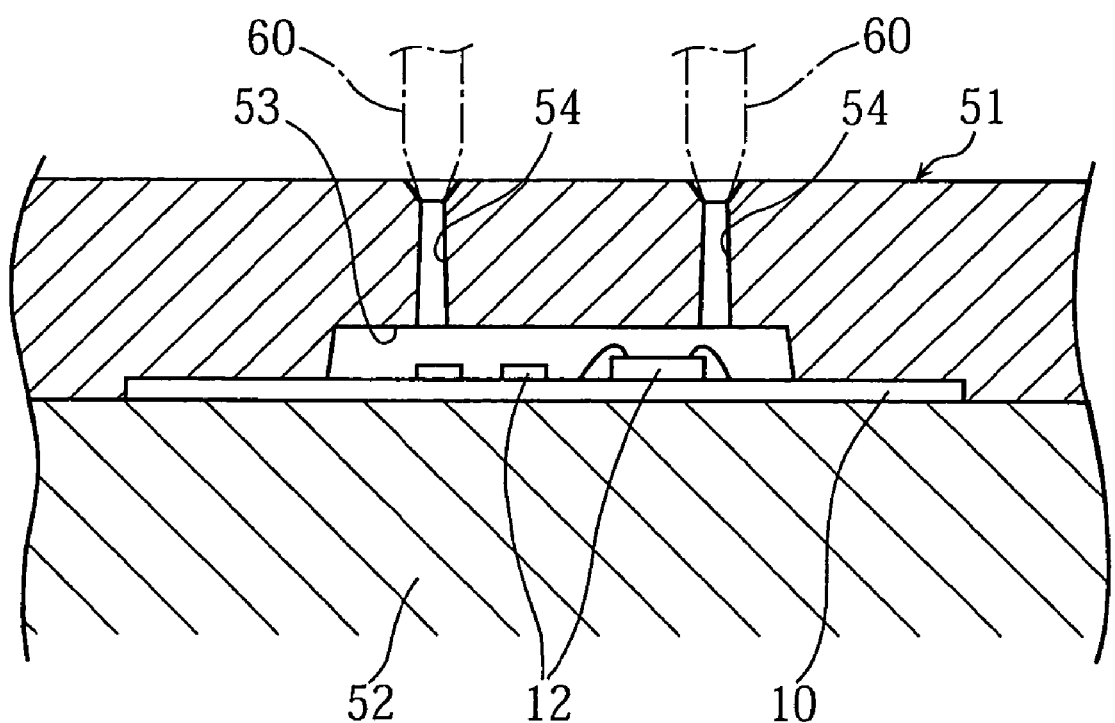
FIG. 4A illustrates the state wherein a substrate on which necessary electronic components are mounted is sandwiched between upper and lower mold members in a process step for forming a molding of a protective circuit module.
Figure 4B:
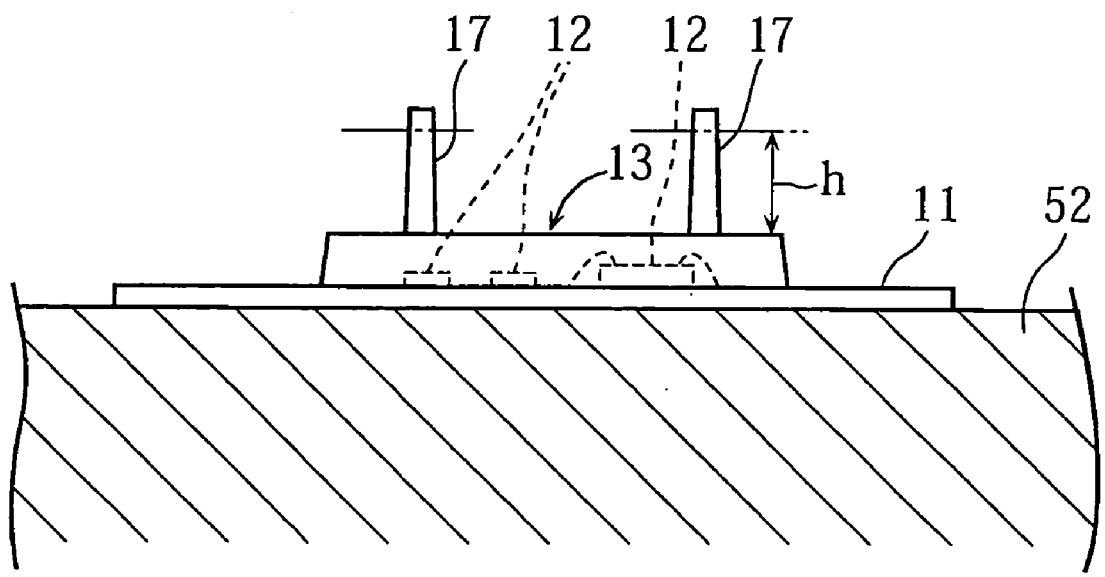
FIG. 4B illustrates the state in which the upper mold member is removed after injecting and solidifying a resin in a process step for forming the molding of the protective circuit module.

The projection 17 can be easily formed in forming the molding 13 on the substrate 11 with the use of mold members 51 and 52 by utilizing gates 54 for injecting a resin into a cavity 53 of the mold member 51. Specifically, as shown in FIG. 4A, the substrate 11 on which necessary electronic components 12 are mounted is sandwiched between the upper and lower mold members 51 and 52, and a resin is injected into the cavity 53 through one end of each gate 54 using an injection nozzle 60. The resin may preferably be a thermoplastic resin such as polyamide for injection in a molten state. As shown in FIG. 4B, when the upper mold member 51 is removed after the solidification of the injected resin, projections 17 each having a configuration corresponding to the gate 54 remains on the molding 13 as projecting from the cover surface 13a. Then, the projections 17 are cut at a predetermined height position h from the cover surface 13a of the molding 13. In this way, the projections 17 are formed without increasing the number of process steps or without the need for changing the mold members.

Figure 5:
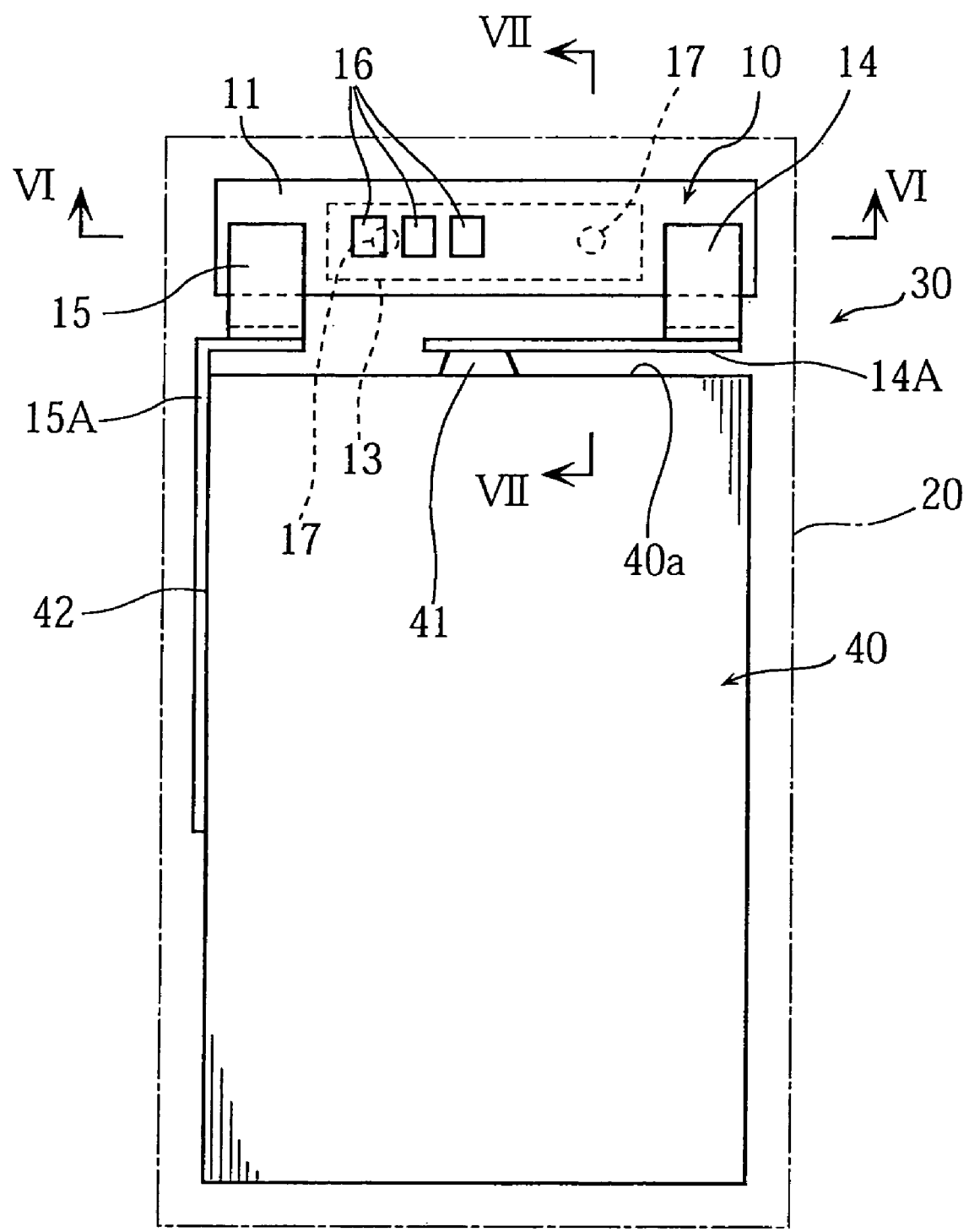
FIG. 5 is a schematic plan view illustrating a battery pack according to another embodiment of the present invention.
Figure 6:
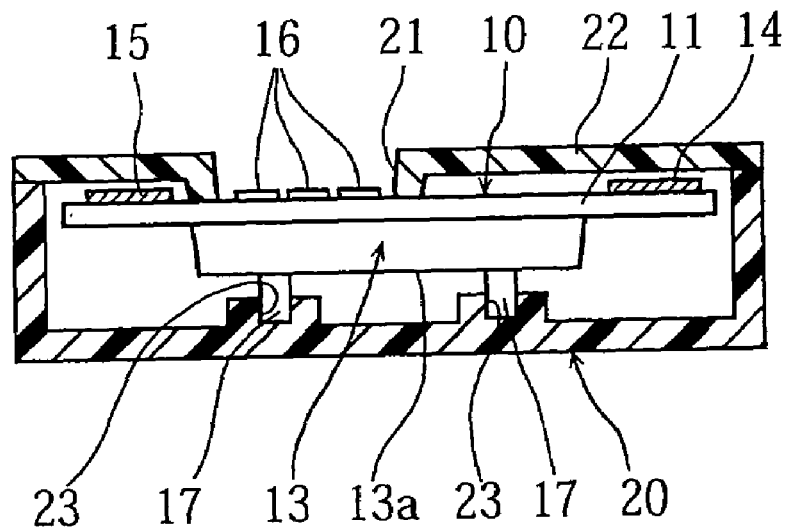
FIG. 6 is a sectional view taken along lines VI-VI in FIG. 5.
Figure 7:
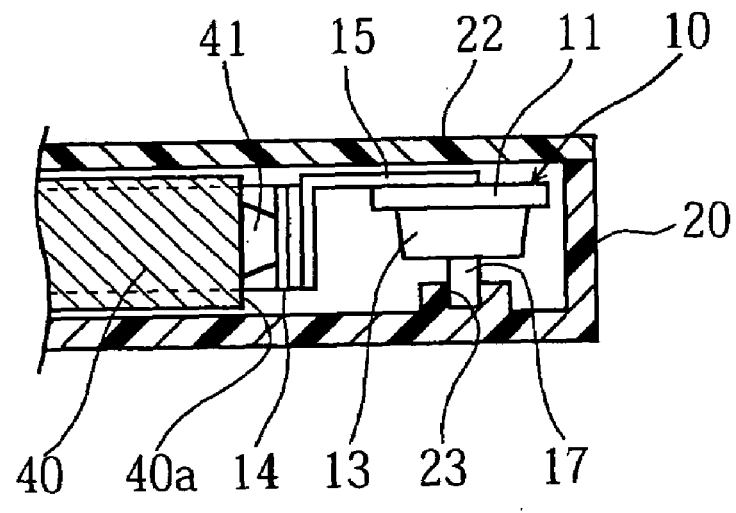
FIG. 7 is a sectional view taken along lines VII-VII in FIG. 5.
Figure 8:
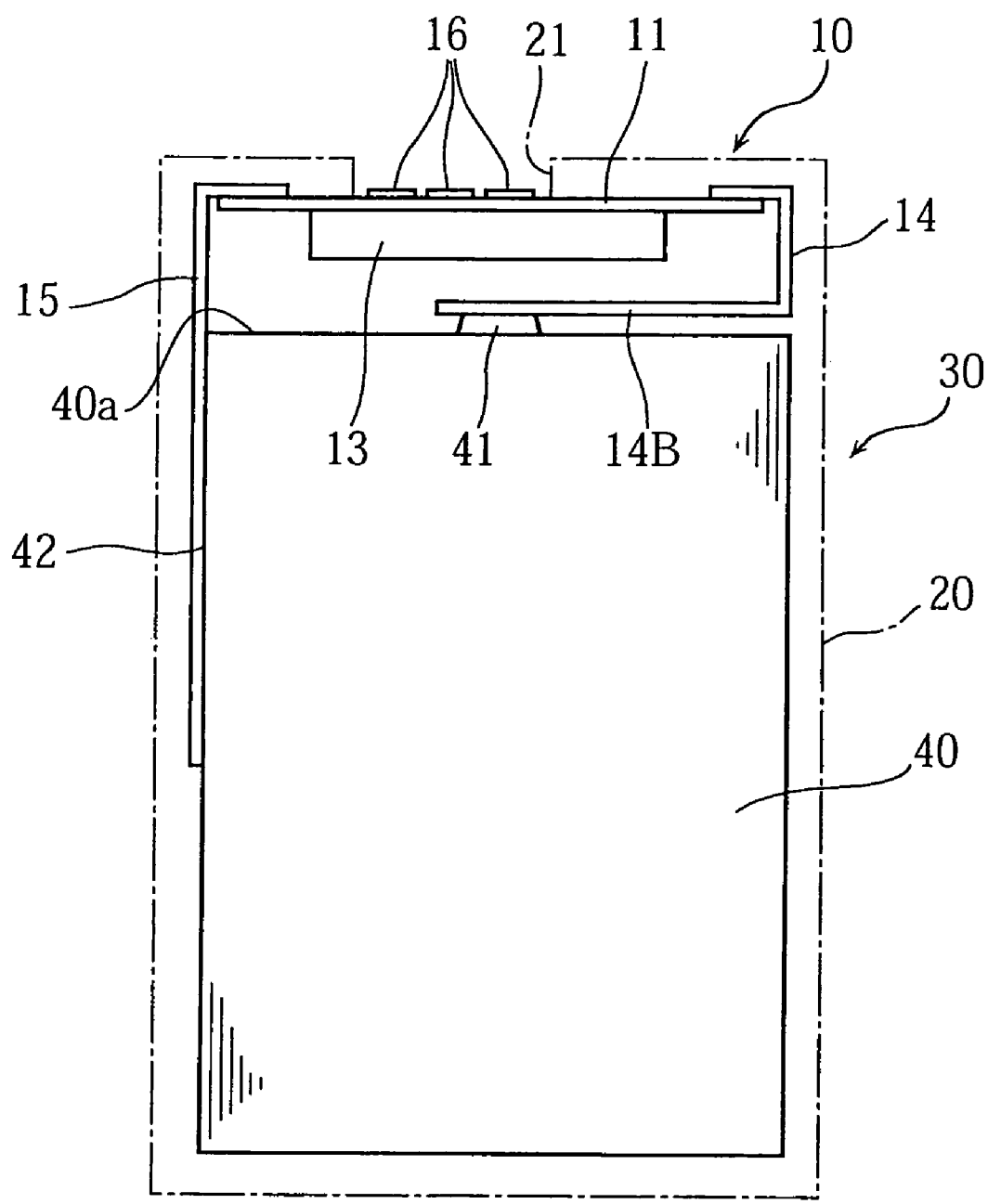
FIG. 8 illustrates a prior art structure.

FIGS. 5-7 illustrate battery pack 30 utilizing a protective circuit module 10 according to a second embodiment. In this embodiment, the protective circuit module 10 includes a substrate 11 which is arranged perpendicularly to an end surface 40a of a rechargeable battery 40 so that a cover surface 13a of a molding 13, which is formed with projections 17, faces an inner surface of a case 20. Accordingly, the conductor plates 14 and 15 are so connected as to extend width wise of the substrate 11 and bent in the same direction as the projecting direction of the projections 17 to provide bent portions which are connected to auxiliary conductor plates 14A and 15A, respectively. Each of the auxiliary conductor plates 14A and 15A is connected to a positive electrode 41 or a negative electrode 42 by spot welding, for example. Terminals 16 formed on a surface of the substrate 11 are exposed to the outside through a window 21 formed in a lid 22 of the battery pack 30 for electric contact with the terminals of a portable equipment, thereby performing reception of a charging current via the main unit of the portable equipment and discharging to the main unit of the portable equipment.

The inner surface of the case 20 facing the molding 13 is integrally formed with a boss hole 23 for fitting each projection 17. Such a structure makes it possible to properly position the protective circuit module 10 thickness wise, lengthwise and widthwise of the battery pack at the same time. In this embodiment, the boss hole 23 for fitting the projection 17 is formed in the case 20. However, an engagement portion formed at the case my have any other configuration if only it can engage the projection 17.

Of course, the scope of the present invention is not limited to the above-described embodiments, and any modification within the scope of the following claims is included in the scope of the present invention. Further, the configuration of the substrate for constituting the protective circuit module, the position and number of the terminals, or the existence or nonexistence of a terminal block provided instead of the terminals does not affect the defining of the scope of the present invention.

The invention claimed is:

1. A battery pack comprising a case, at least one rechargeable battery housed in the case, and a protective circuit module housed in the case,
   wherein the protective circuit module comprises an elongate substrate having a pair of longitudinal edges, a first surface and a second surface opposite to the first surface, an electronic component mounted on the second surface of the substrate for constituting a protective circuit, a molding formed on the second surface of the substrate to enclose the electronic component, and terminal plates connected to the first surface of the substrate for connecting the protective circuit to the rechargeable battery, the molding including a cover surface oriented opposite to the first surface of the substrate and a projection integrally formed on the cover surface to project therefrom,
   one of the terminal plates including a first portion connected to the first surface of the substrate and projecting widthwise of the elongate substrate across one of the longitudinal edges of the elongate substrate, and a second portion bent perpendicularly relative to said first portion to extend alongside said one of the longitudinal edges of the elongate substrate without interfering with the projection,
   the protective circuit module being positioned by bringing the projection of the molding into engagement with an engagement portion formed at an inner surface of the case.

2. A protective circuit module comprising an elongate substrate having a pair of longitudinal edges, a first surface and a second surface opposite to the first surface, an electronic component mounted on the second surface of the substrate for constituting a protective circuit, a molding formed on the second surface of the substrate to enclose the electronic component, and terminal plates connected to the first surface of the substrate for connecting the protective circuit to a rechargeable battery;
   wherein the molding includes a cover surface oriented opposite to the first surface of the substrate and a projection integrally formed on the cover surface to project perpendicularly to the first and second surfaces of the substrate; and
   wherein one of the terminal plates includes a first portion connected to the first surface of the substrate and projecting widthwise of the elongate substrate across one of the longitudinal edges of the elongate substrate, and a second portion bent perpendicularly relative to said first portion to extend alongside said one of the longitudinal edges of the elongate substrate without interfering with the protection.

* * * * *